SELECTIVELY AMPLIFYING LOUD-SPEAKING TELEPHONE

Filed Nov. 12, 1954

2,821,572
Patented Jan. 28, 1958

2,821,572

SELECTIVELY AMPLIFYING LOUD-SPEAKING TELEPHONE

Joseph F. Houdek, Jr., Elmhurst, Ill., assignor to International Telephone and Telegraph Corporation, New York, N. Y., a corporation of Maryland Application November 12, 1954, Serial No. 468,381

4 Claims. (Cl. 179—1)

Figures 1, 2:
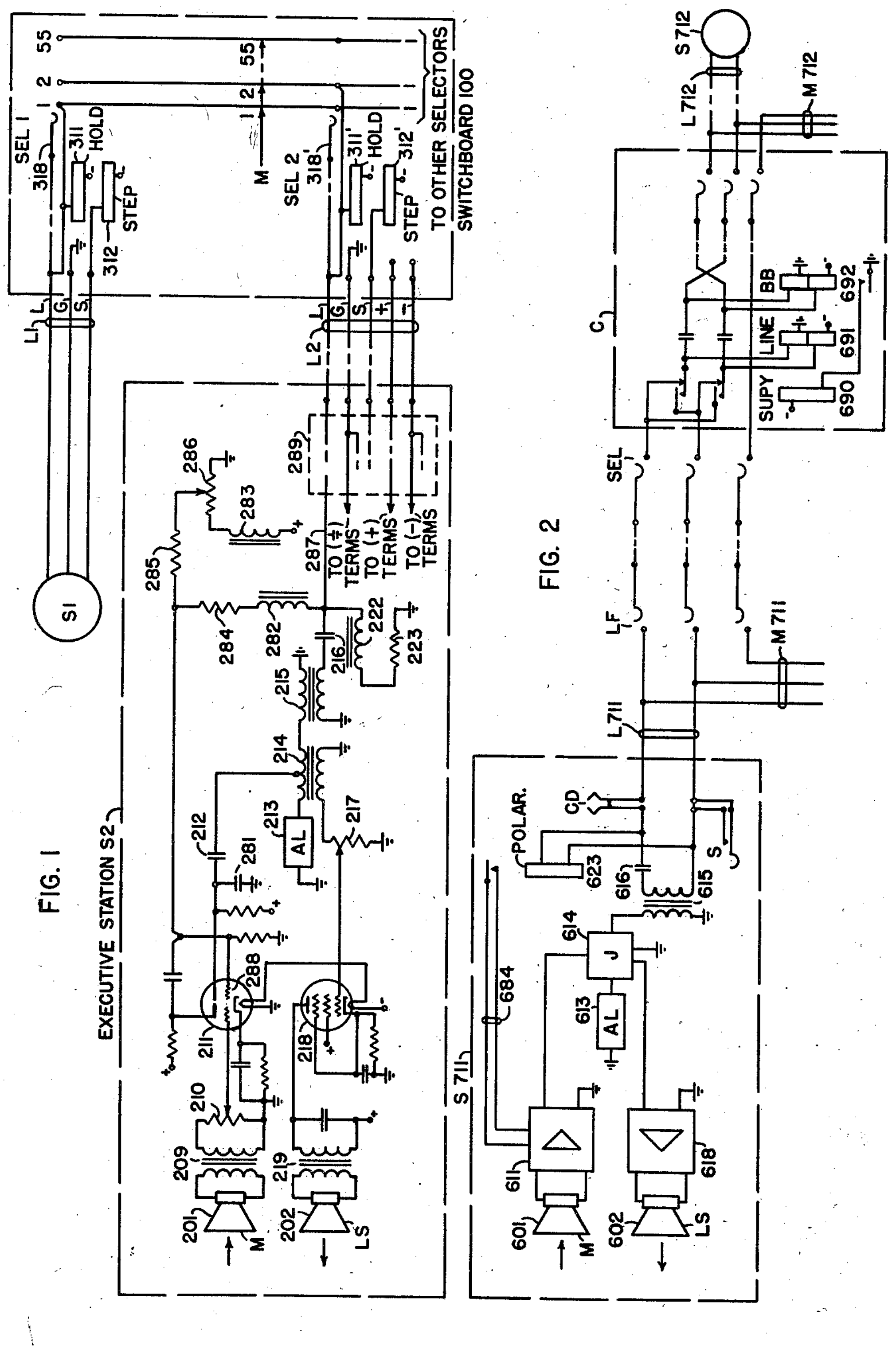

This invention relates to a selectively amplifying loud-speaking telephone, and more particularly to a balanced-junction type of two-way loud-speaking telephone. Its object is to permit the use of a greater amplifier gain than heretofore without the occurrence of howling.

Reference is made to the pending United States patent application of Joseph F. Houdek, Jr., for an Automatic Intercommunication Telephone System, Serial No. 281,997, filed April 12, 1952, which illustrates the use of loud-speaking telephones in an automatic switching intercommunicating telephone system. There, the amplifiers of a calling loud-speaking telephone must be activated at the end of the setting operations, and thus before the desired connection is completed and an answer is obtained, so as to enable the caller to hear the usual busy tone in case the connection is withheld because the called line is busy. Therefore, the full non-howling amplification permitted by a balanced-junction arrangement cannot there be realized, for the artificial-line impedance used must be a compromise between a balance with the impedance of the calling line alone and a balance with the impedance presented by the calling line when connected with a called line in answered condition. This impedance difference is particularly great in an intercommunication system which employs lines of short physical length and of consequent low impedance.

According to the invention, the overall amplification at a calling loud-speaking telephone is kept low until the call is answered, and is thereupon automatically increased to full value, thus permitting the impedance of the artificial line to be adjusted for the best balance under the answered condition. Moreover, the condition of partial amplification is automatically restored when the receiver is replaced on the called line, and the preferred arrangement is one in which the alteration in amplification occurs only in the transmitting path, so as to leave the receiving path fully active at all times when a call is being made. On a received call, full amplification is rendered effective on answering.

The foregoing and other objects and features of this invention and the manner of attaining them will become more apparent, and the invention itself will be best understood, by reference to the following description of embodiments of the invention taken in conjunction with the accompanying drawings comprising Figs. 1 and 2 wherein:

Fig. 1 shows a first embodiment wherein the invention is applied to a loud-speaking telephone for use in the local intercommunication system of the cited prior application; and Fig. 2, shows a second embodiment wherein the invention is applied to a conventional two-wire reverse-battery automatic telephone system.

*First embodiment.—Fig. 1*

Referring to Fig. 1, the illustrated switchboard 100, ordinary telephone station S1 and loud-speaking station S2 correspond respectively to items 100, S1, and S2 in the cited pending application.

Referring to station S1, for example, a call is made therefrom by closing a loop between the L and G wires of its line L1, and then transmitting pulses over the S wire to step the single brush 318 of its individual selector SEL–1 at switchboard 100. A metallic connection is completed by brush 318 between the L wires of the calling and called lines. The answering station closes its loop (between its L and G wires) to complete the talking connection.

Assume that a call is made from loud-speaking station S2 to station S1. The call is controlled by equipment 289, which is the signalling and control apparatus shown in detail in Fig. 2 of the cited application. The loop is closed from wire L of line L2, over wire 287 and circuit 222, 223, to wire G; the stepping pulses are transmitted over the S wire; the called station is signalled; and then the + wire is connected to the + terminals of the amplifiers.

When the call is answered at station S1, the talking connection is completed. At station S2, the line L2 is connected through condenser 216 and transformer 215 to balanced junction 214. Signals from microphone 201 are coupled through transformer 209, volume control 210, transmitting amplifier 211, and condenser 212 to junction 214. Received signals through junction 214 are coupled through volume control 217, amplifier 218, and transformer 219, to speaker 202.

Signals from the transmitting amplifier divide through junction 214 between artificial line 213 and transformer 215. Feedback signals between microphone 201 and loud-speaker 202 are cancelled to the extent that the impedance of artificial line 213 matches the impedance presented through transformer 215. Condenser 281 added to the circuit helps limit the band width to simplify balancing.

If station S2 is called, answering connects the L and + wires of line L2 to wire 287 and the + terminals respectively to complete the talking connection.

According to the invention, the line voltage appearing between wire 287 and wire G at station S2 is used to control the grid bias of the second half of the dual-triode transmitting amplifier 211 between a potential which cuts off output and a normal operating potential. The bias network added to the circuit comprises coils 282 and 283, and very high-resistance resistors 284, 285, and 286. The slider of resistor 286 may be adjusted until the desired bias appears at amplifier 211 under each of the two line conditions (answered or unanswered).

When a call is made from the loud-speaking station S2 to station S1, plate voltage is supplied to the amplifiers 211 and 218 after the setting of the selector brush 318′ and signalling is completed. With the selector switched through to connect the calling and called lines, and with the called station S1 not yet answered, the voltage between wires 287 and G at station S2 is such that transmitting amplifier 211 is biased to block any output through condenser 212. After station S1 is answered and the transmitter, or other low-resistance circuit, is bridged between the L and G wires of line L1; the voltage between wires 287 and G at station S2 results in a bias at amplifier 211 which permits normal output.

If the called line is busy, wire L of line L2 is connected to a source of busy tone (not shown), instead of being connected to the brush 318′ and line L1. The line voltage at station S2 results in a bias value which cuts off output from amplifier 211. Therefore, busy tone may be heard through amplifier 218 and speaker 202, without feedback through the transmitting path.

On a call made from station S1 to station S2, when station S2 answers the loop is already closed at station S1, and therefore the proper bias condition is obtained for normal output from amplifier 211.

On any call between stations S1 and S2, if station S1 disconnects first, the bias will be obtained at station S2 which prevents output from amplifier 211.

Since the amplifiers of station S2 are operative for full two-way amplification only when the line L2 is connected to a line on which the station is answered, artificial line 213 may be designed for best impedance match with a talking connection.

The voltage between wires 287 and G at station S2 varies with the length of the line, resulting in more gain from amplifier 211 on a long line than on a short line. Therefore the bias circuit also acts as an automatic gain control.

*Second embodiment.—Fig. 2*

Fig. 2 illustrates an embodiment of the invention as applied to a conventional automatic telephone system, wherein the answering of the called station is indicated by a reverse-battery supervision.

A loud-speaking station S711 includes a microphone 601 operating into transmitting amplifier 611 and a loud-speaker 602 from receiving amplifier 618, the amplifiers being coupled to the line terminals through balanced junction 614, transformer 615, and condenser 616. A polar relay 623 controls operation of amplifiers 611.

Assume that the party at station S711 desires to call station S712. Closing switch S connects station S711 to line L711, closing a direct-current loop through polar relay 623, which does not operate at this time. A line finder LF on multiple M711 at the exchange is seized and connected to the calling line. Pulses are transmitted by means of calling device CD, operating selector SEL, and a connector C on multiple M712, to establish a connection to the called line L712. In connector C, battery is supplied to the calling line L711 by line relay 691 and to the called line L712 by back-bridge relay 692.

Transmitting amplifier 611 is adjusted to prevent output before the call is answered, so that signals from microphone 601 do not reach junction 614. Amplifier 618 is operative so that signals received from the line, such as busy tone, may be heard from loud-speaker 602.

When the call is answered and the loop closed at station S712, back-bridge relay 692 operates and at its contacts closes a circuit for supervisory relay 690. At the contacts of relay 690 battery is reversed for the calling line L711. Polar relay 623 operates, and at its contacts closes a circuit over path 684 to render amplifier 611 operative for normal transmission.

The connection is released when the calling station S711 disconnects. If the called station S712 disconnects first, the relays 692, 690, and 623 release, and output is cut off from amplifier 611.

The connection from back-bridge relay 692 to the brush terminals of connector C is of a polarity such that, if station S712 is a loud-speaking station similar to station S711, when the call is answered at station S712 its polar relay will operate and permit amplifier output for two-way transmission.

It may be seen that when a call is made from a loud-speaking station S711, the amplifiers are operative for full two-way transmission only when the loop is closed at the called station. Any connection at a called station is a talking connection. Therefore the artificial line 613 may have an impedance which is the best match under talking conditions.

While I have described above the principles of my invention in connection with specific apparatus, it is to be clearly understood that this description is made only by way of example and not as a limitation to the scope of my invention as set forth in the accompanying claims.

I claim:

1. In a switching system including telephone lines having telephone stations respectively thereon, each station including local switch means operable and restorable between a normal position and an in-use position and means responsive to its operation to the in-use position incidental either to the initiation of a call or to the answering of a call for closing a direct-current path across the associated line, thereby altering the normal impedance of the line to an in-use value, means responsive to the closing of a direct-current path at a station for establishing a flow of direct-current over the associated line, means for rendering the flow of direct current on any line variable between a connected value and an isolated value according to whether or not another line in its in-use condition is connected therewith, means including switchboard means for directly connecting any calling line to any idle called line and for signalling the station thereon, one said station being a loud-speaking station including a microphone and a loud-speaker connected to separate circuit branches, amplifying means in at least one said branch, a local artificial line for substantially balancing the effective in-use impedance of the associated telephone line combined with the in-use impedance of another line to which such line is connected, a balanced junction at the loud-speaking station interposed between the said lines thereat providing branch terminals which are coupled to both lines and which are conjugate when an impedance balance exists between the artificial line and associated telephone line, the microphone and loud-speaker circuit branches being connected to the said branch terminals, whereby undesired regenerative acoustic feedback from speaker to microphone is avoided under a balanced impedance condition in that signals from the microphone branch are then cancelled from appearance in the loud-speaker branch, a resistance device in the line at the loud-speaking station and a circuit path for supplying a control bias to the amplifying means according to the voltage drop across the resistance device, means for biasing the amplifying means to a condition of low amplification responsive to the voltage drop across the resistance device with said isolated value of direct-current flow on the associated line, whereby the undesired regenerative acoustic feedback which would occur if a higher amplification were used under the then existing condition of impedance unbalance is prevented, and means responsive to the voltage drop across the resistance device with the said connected value of direct-current flow on the associated line for biasing the amplifying means to a condition of increased amplification at the said amplifying means for conversation.

2. A switching system according to claim 1, wherein the said amplifying means includes a transmitting amplifier in the said microphone circuit branch and a receiving amplifier in the loud-speaker circuit branch, and the said means for biasing the amplifying means to a condition of low amplification comprises means for substantially disabling the transmitting amplifier while leaving the receiving amplifier fully operative.

3. In a switching system according to claim 1, wherein in the said amplifying means is so arranged and connected that its amplification varies indirectly with the value of the said control bias, wherefore it is greater for lines of high resistance than for lines of low resistance.

4. In a switching system including telephone lines hav- telephone stations respectively thereon, each station including local switch means operable and restorable between a normal position and an in-use position and means responsive to its operation incidental either to the initiation of a call or to the answering of a call to establish an in-use current-flow condition thereover, means including switchboard means for connecting any calling line to any idle called line and for signalling the station thereon, one said station being a loud-speaking station including amplifying means, the value of the in-use current-flow condition depending on the resistance of the line, control means in the line at the loud-speaking station, and the said amplifying means being so arranged and connected to the control means that its amplification varies indirectly with the value of the in-use current-flow condition of the associated line, wherefore greater gain is obtained for lines of high resistance than for lines of low resistance.

References Cited in the file of this patent

UNITED STATES PATENTS

| | | |
|---|---|---|
| 2,369,351 | Herrick | Feb. 13, 1945 |
| 2,369,352 | Herrick | Feb. 13, 1945 |
| 2,370,388 | Baird | Feb. 27, 1945 |
| 2,545,477 | Levy | Mar. 20, 1951 |
| 2,623,949 | Jeanlin | Dec. 30, 1952 |
| 2,655,557 | Stanbury | Oct. 13, 1953 |